United States Patent [19]
Jones

[11] Patent Number: 5,502,367
[45] Date of Patent: Mar. 26, 1996

[54] HIGHWAY CROSSING CONTROL

[75] Inventor: Richard S. Jones, Swansea, S.C.

[73] Assignee: Union Switch & Signal Inc., Pittsburgh, Pa.

[21] Appl. No.: 292,580

[22] Filed: Aug. 19, 1994

[51] Int. Cl.⁶ .................. H02P 7/06; B61L 1/08
[52] U.S. Cl. ............... 318/281; 318/286; 318/293; 246/128
[58] Field of Search .................. 246/125–130; 318/281, 282, 283, 286, 287–291, 293

[56] References Cited

U.S. PATENT DOCUMENTS 3,601,603  8/1971  Hughson .................. 318/293 X
3,964,704  6/1976  Karr ........................ 246/125
4,289,995  9/1981  Sorber et al. ............. 218/282 X
4,369,943  1/1983  Hussein .................... 246/127
4,614,902  9/1986  Jessup ...................... 318/282

Primary Examiner—Brian Sircus
Attorney, Agent, or Firm—Buchanan Ingersoll

[57] ABSTRACT

Highway crossing gate control circuit in which a permanent magnet motor is controlled to drive up and drive down the gate arm by utilization of a single motor control relay and controller contacts which sense the position of the gate arm. The motor polarity is reversed through utilization of the motor control relay, which is operated by a single up input signal. Provision is included for dynamic breaking on the arm moving downward after an initial drive down mode.

10 Claims, 5 Drawing Sheets

HIGHWAY CROSSING CONTROL

BACKGROUND OF THE INVENTION

The invention relates to an electrical circuit for controlling the drive mechanism of a highway crossing gate. Highway crossing gates are currently used at railroad/highway crossings. Such gate mechanisms may also be used at other crossings or areas where it is desired to alert traffic on one right-of-way to the approach of traffic or vehicles on the crossing right-of-way.

Generally these mechanisms use a crossing arm which is counterweighted to a generally horizontal position and which is selectively raised through the use of a drive motor. Such mechanisms can be characterized as those using a two-wire system and those using a three-wire system. In a two-wire system the two wires refer to a control signal which indicates the arm should be in a raised or up position. The second wire in a two-wire system refers to a power wire. In a so-called three-wire system, a control signal indicating a desired arm-position, a control signal indicating a desired arm-down position and a power wire constitute the three wires. In both the two-wire and three-wire systems the nomenclature omits the fact that a common wire is also used.

This invention relates to the type of crossing control known as a two-wire system (actually having at least three wires including a common) which gets an input signal indicating the desirability to have an arm-up position and a power source.

In addition, the highway crossing mechanisms generally use DC drive motors, often through internal gearing, to raise and lower the gate arm. Highway crossing mechanisms can also be characterized by the type of motor used to control both the up and downward movement of the crossing arm, namely permanent magnet motor or field coil motors. This invention relates to a permanent magnet motor type crossing gate control circuit of the two-wire type.

It is the desire in highway crossing gates to maintain a high level of vitality. Vital crossing design is such that component failures are minimized and when such failures do occur, the overall device tends to fail in a default mode. This can be seen in that the highway crossing design generally uses a gravity force to lower the crossing arm. As such, should an input signal fail, the unit can be lowered through the force of gravity to a horizontal or blocking position. To maintain the vital concept throughout the equipment includes the desire to minimize electrical components in the circuit. The reduction of a component from a given circuit reduces the likelihood that such component will fail and increases the overall reliability of the device. Because vital circuits often rely on vital components and vital components can be quite costly, the reduction of circuit components can result in a device that is less costly and more reliable.

Control of the motor in the highway crossing mechanism requires a bidirectional motor operation. Use of separate field coils in DC motors has permitted control circuits to provide the necessary functions using a reduced number of relays. However, prior art devices using permanent magnet motors have required more than one electrical control relay. While it has been desirable to use a permanent magnet motor to obtain the necessary electromechanical drive without the necessity for providing motor field currents, such permanent magnet control circuits have correspondingly required additional circuit control relays. The invention provides for a highway crossing circuit, which controls a permanent magnet motor for both drive-up and drive-down functions of the gate arm, while using only a single control relay. Specific prior art circuits are shown in FIGS. 2–4. Co-pending application, Ser. No. 08/291,094, filed Aug. 16, 1994, of Richard S. Jones et al., entitled Highway Crossing Gate Mechanism Circuit Contact, is incorporated herein by reference.

SUMMARY OF INVENTION

The invention uses only a single motor control relay and the highway crossing controller contacts to control a permanent magnet motor. The permanent magnet motor is controlled to provide a drive-up mode which raises the gate crossing arm, and a drive-down mode in which the arm is driven down by the permanent magnet motor. During the movement downward of the gate arm, the circuit changes from a motor-driven downward mode to a dynamic braking mode. Advantages of using a permanent magnet motor are obtained by the circuit, and at the same time only a single motor control relay need be used. The use of a single vital relay as a motor control relay results in a substantial cost savings and provides a high level of reliability and vitality. The single motor control relay has at least three single-pole, double-through contact sets. The circuit utilizes two controller contacts. One controller contact senses the gate arm between an intermediate position and the up position. Another controller contact senses the gate arm in the up position and is a single pole double throw contact.

DESCRIPTION OF PRIOR ART AND EMBODIMENTS

Figure 1:
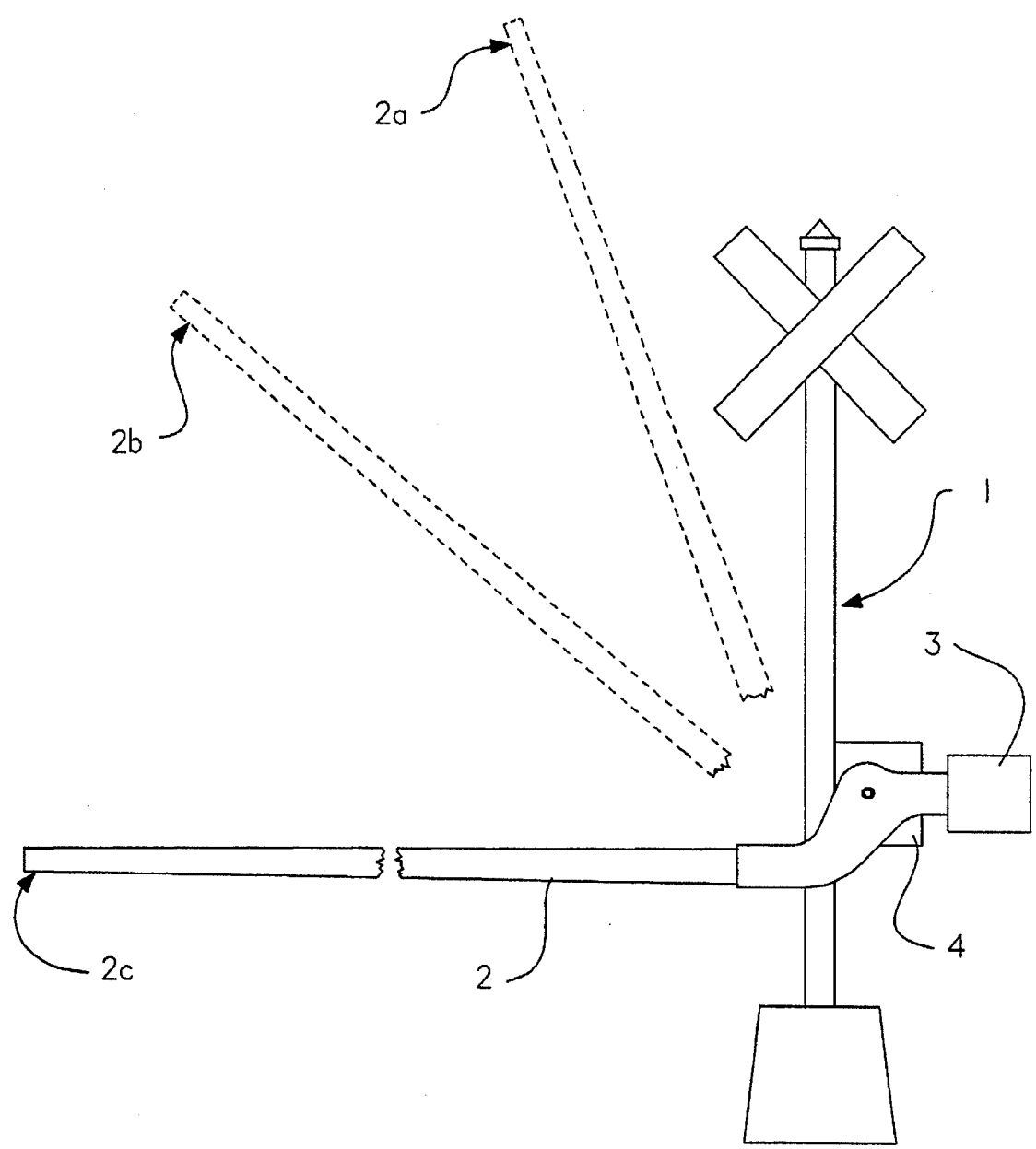
FIG. 1 is an elevational view of a highway crossing mechanism showing three positions of the crossing arm.

FIG. 1 shows a highway crossing gate, 1, having a gate arm, 2, attached to a mechanism that has a counterweight, 3. The mechanism is driven and controlled by equipment contained in a control housing, 4. The control housing, 4, contains electrical circuit controls, gearing, a controller portion having cam switches and an output shaft which drives the arm pivotally between positions 2a, 2b, 2c. As shown, FIG. 2C has the crossing arm in the down or horizontal position. This position is generally used to alert motorists or pedestrians of the presence of a rail vehicle. Counterweights, 3, are chosen to offset some of the cantilevered load resulting from arm, 2, and thereby permit gravity to hold arm, 2, in a horizontal position absent any external forces generated on the arm by the gate mechanism. When the system does not detect the presence of a rail vehicle or when the control up signal is supplied to the two-wire circuit in housing, 4, the arm, 2, is raised from position 2c to a generally vertical or up position to 2a. For nomenclature purposes, the rotation of the gate arm can generally be thought to be approximately 90°, where the vertical or "up" position, 2a, generally corresponds to 90° and the horizontal or "down" position, 2c, corresponds to 0°. It is to be understood, however, that these are merely approximations and, in fact, in specific applications the degrees of rotation may vary greater or lesser than that shown in FIG. 1. When the highway crossing gate is in the up position, 2a, and is receiving an electrical signal corresponding to a desired up position, the crossing arm, 2, will be held in the position 2a by a mechanical means such as a shaft brake on the motor. However, when the up signal is not supplied or removed, it is then desired that the crossing arm, 2, be power driven downward to position 2c. During the first part of the downward cycle, the motor supplies torque to pivot the arm downward and is assisted by gravity. However, as the crossing arm moves downward, it accelerates and picks up speed to a point where it is no longer desirable to use the motor drive to push the arm down. In many applications it is desirable at this point, 2b, to change from a motor-powered down mode to an electrical braking mode using the motor as a generator and dynamic braking the crossing arm, 2, as it travels downward from the position 2b to the position 2c. Using dynamic braking provides a measure of downward speed retardation to the arm to avoid the arm crashing to the horizontal position, 2c.

Figure 2:
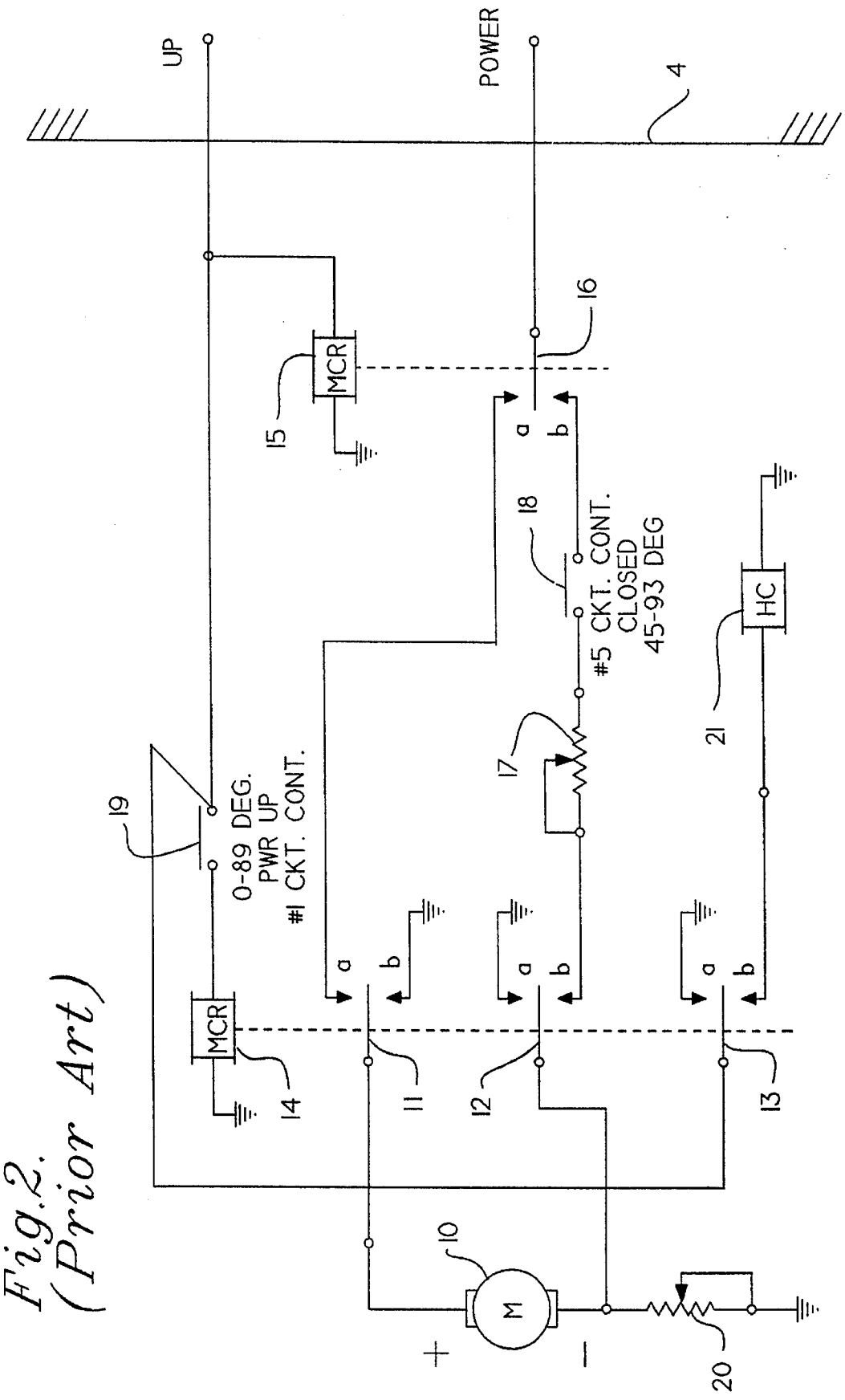
FIG. 2 is a circuit diagram showing a prior art circuit using two motor control relays to control a motor.

FIG. 2 shows a prior art design typical of permanent magnet motor control circuits. Such circuit is used in the Union Switch & Signal Model 75 gate mechanism. Motor, 10, is controlled through the utilization of two motor control relays, 14, 15. The circuit, within a control housing, 4, receives an up signal and a power input. In addition there is a common wire (not shown in this figure) which is also run. It is common for the highway crossing mechanisms to have a crossing controller which includes a number of cam-operated switches or other sensors which provide electrical contacts indicative of the gate arm being located in specific positions. FIG. 2 uses two such contacts from the circuit controller, typically cam-operated switches, shown as 18 and 19. When the up signal is present in FIG. 2 and the crossing arm is in the full up position, 90°, the control relay, 15, is picked up and its switch contact is in the "a" position. However, motor control relay, 14, is not picked up because controller contact, 19, is open. However, a motor-operated brake is applied to hold the gate arm in its upward position through contact, 13b, which is in position "b", to activate the hold clear coil, 21, of the brake. As a result, the motor is off and the brake holds the arm in the up position. Should the up signal be removed, such as would occur during the presence of a vehicle approaching the highway crossing gate, motor control relay, 15, becomes deactivated and its contact, 16, moves to position "b." In addition, the lack of a signal through contact 13, in position "b" causes the brake to disengage via hold clear coil, 21, and the crossing arm begins to descend. When the crossing arm is between 0° and 89°, the circuit controller contact, 19, is closed and motor control relay, 14, is activated. Between 45° and 89° the motor, 10, is driven down by power being applied through 16b, 18, current limiting resistor 17, 12b and 11b. At position 2b of the gate arm, circuit contact 18 opens, causing the motor to cease receiving power from the supply and the control changes into a dynamic braking mode through the snubbing resistor, 20. The gate arm then, influenced by dynamic braking and gravity forces, reaches position 2c.

When an up signal is received and the gate arm is in the down, 2c position, both motor control relays 14 and 15 are picked up, and their contacts go to their respective "a" positions. As such, the power is applied through 16a, 11a, motor, 10, 12a. When the gate arm reaches 90° the motor control relay, 14, drops out because 19 opens, changing contacts 11, 12 and 13 to their "b" position. This turns off the motor-up current and sets the hold clear brake, 21, through 13b. As can be seen, this circuit functions satisfactorily and meets the criteria which has previously been discussed. However, the circuit requires the utilization of two motor control relays, 14 and 15.

Figure 3:
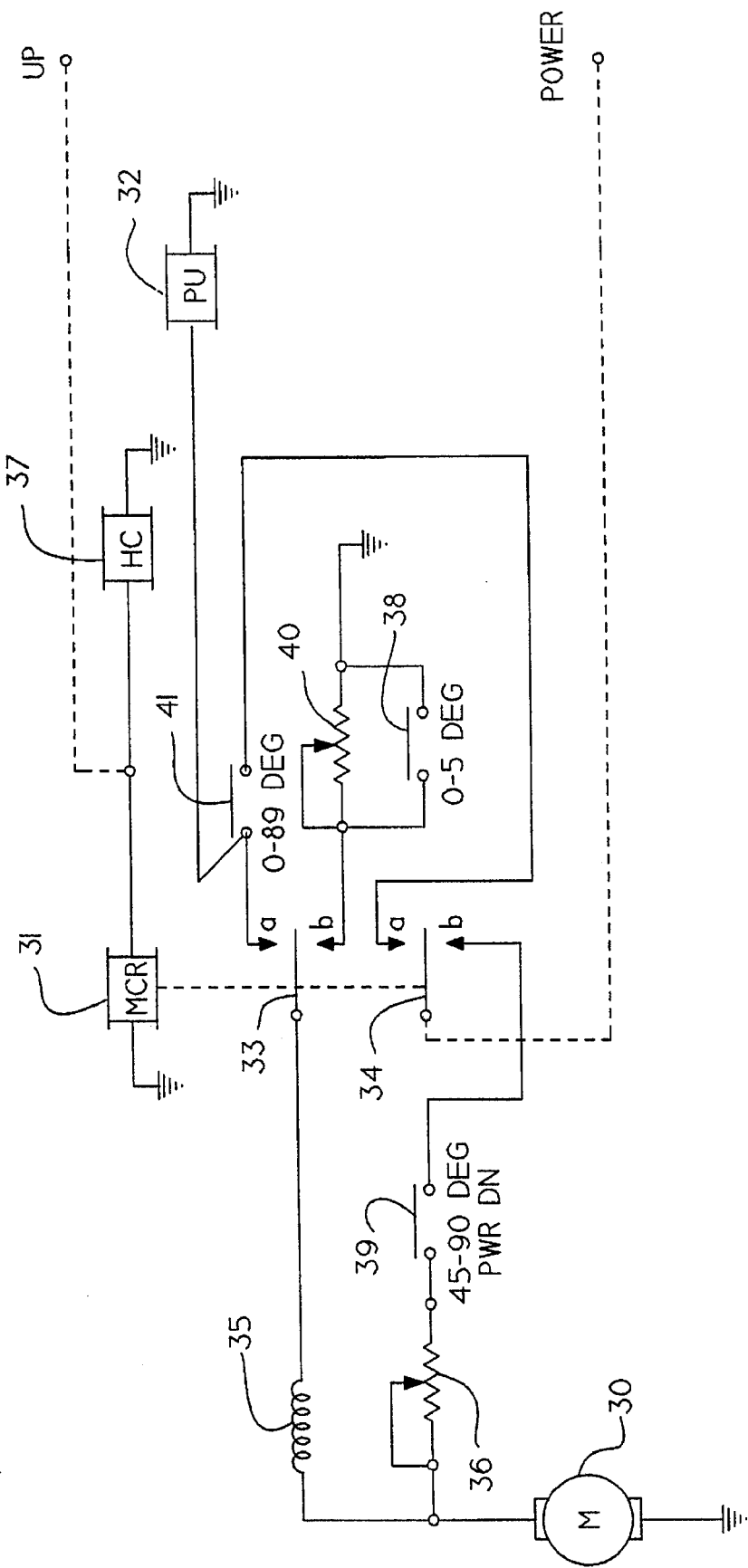
FIG. 3 is a circuit diagram showing a prior art device using a motor control relay to control a field coil DC motor.

Looking at prior art, FIG. 3 shows a gate control circuit of the two-wire type, having an up input and a power input. When the gate arm is in the up position and the control voltage goes to 0, the motor control relay, 31, is released. The power supply is connected to power-down the gate arm through contact 34b, controller contact, 39, limiting resistor, 36, to motor, 30. When the gate arm, 2, reaches the 45° point, 2b, the motor is shut-off by contact, 39, and gravity pulls the gate arm through the remaining degrees of rotation. During this time, the motor is caused to dynamic brake through snubbing resistor, 40, and at a very low angle, 5°, controller contact, 38, shunts out snubbing resistor, 42, and allows additional dynamic braking.

During the power-up mode, the up control signal is available to pick up motor control relay, 31, which causes contacts, 33 and 34, to go to their "a" positions. Power is supplied through contact 34a, controller contact, 41, contact 33a, through the series arrangement of motor field coil, 35, and DC motor, 30. During this time both the hold clear solenoid coil, 37, and the pick-up coil, 32, are activated but do not apply the brake, as this mechanism contains a one-way clutch drive. When the gate arm reaches 90°, controller contact, 41, disconnects the motor from the power and pick-up coil 32. The hold clear coil, 37, remains activated by the up command signal.

Figure 4:
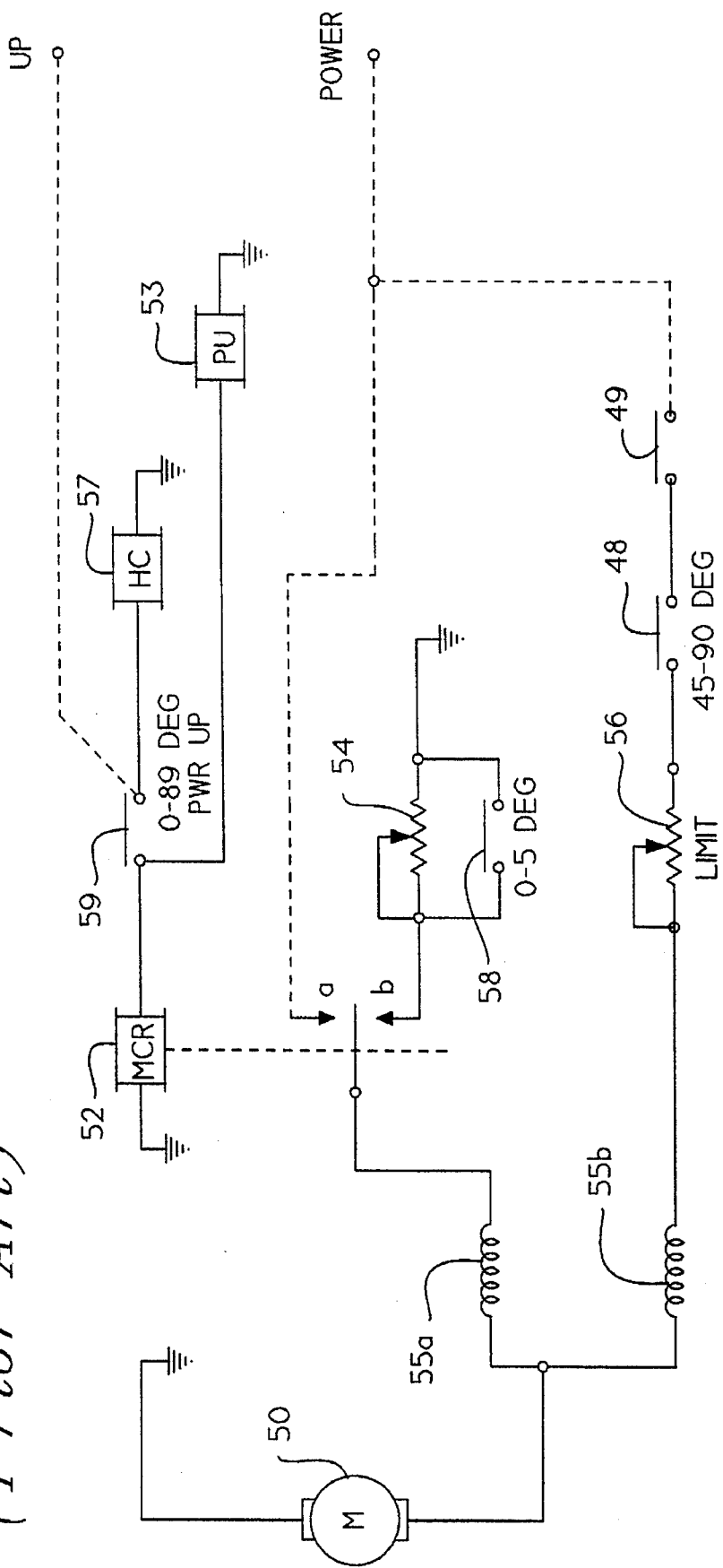
FIG. 4 is a circuit diagram showing a prior art device using a motor control relay to control a motor having two field coils.

FIG. 4 shows a prior art circuit design using a DC motor, 50, having two field coils, 55a and 55b. Power is supplied alternatively to either field coil to power the unit upward or downward. Power down is accomplished through the power arriving at contact 49, which is a contact controlled by the hold clear coil, 57, such that it is closed when the hold clear coil, 57, is deactivated. Power through, 49, continues to controller contact, 48, and current limiting resistor, 56, to field coil, 55b. Motor, 50, is therefore driven down between 90° and 45°. At 45° dynamic braking occurs through motor, 50, field coil, 55a, contact, 52b, and either the snubbing resistor, 54 or the shunting low resistance contact, 58. Once the gate arm is in the 2c position and a signal is received to power up, control relay, 52, is activated to pull the contact to the "a" position, which provides power through motor field coil, 55a, to motor, 50. When the gate arm reaches position 2a and is 90°, contact 59 opens and the hold clear coil, 57, maintains the brake. Pick-up coil, 53, drops out.

Figure 5:
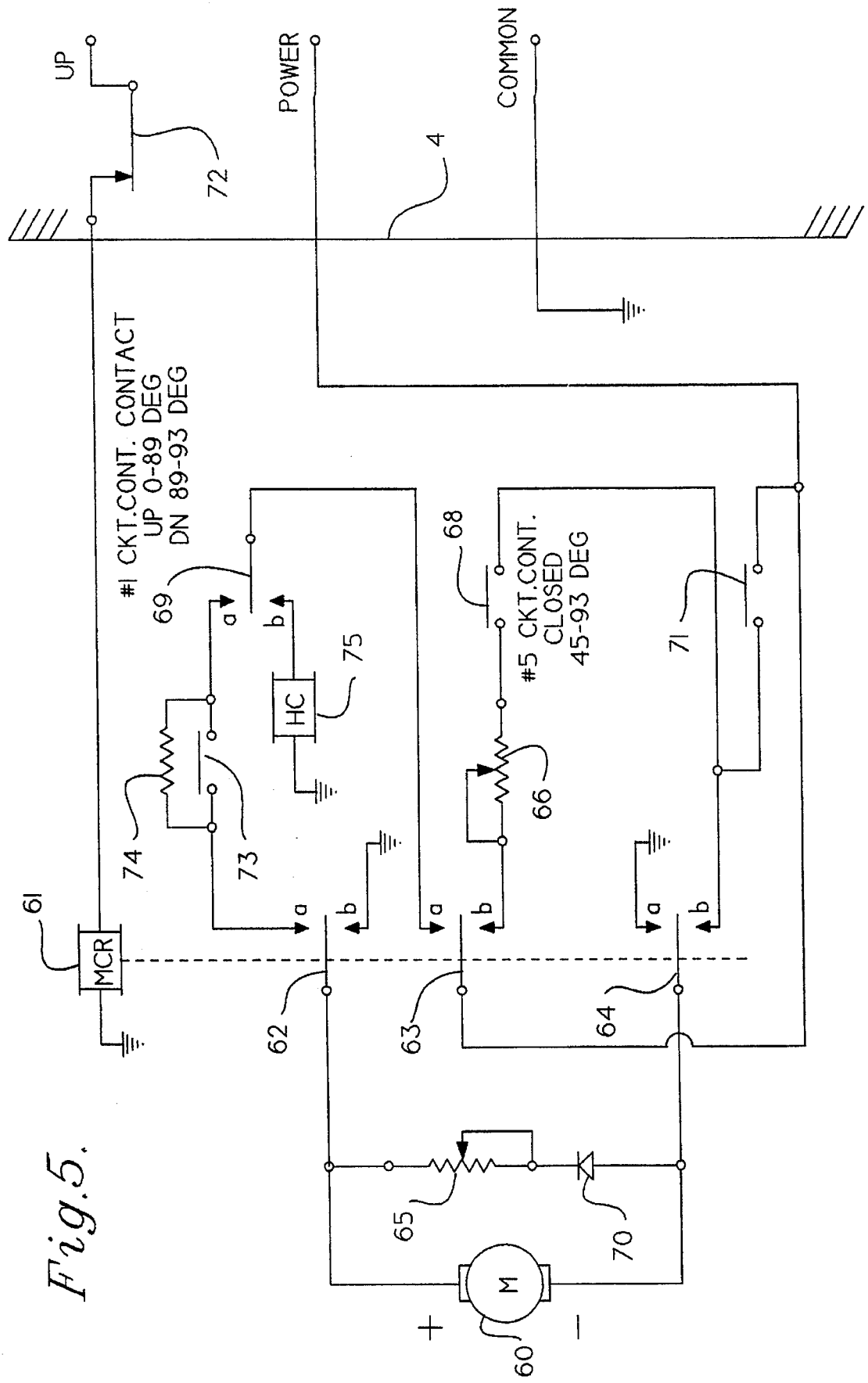
FIG. 5 is a circuit diagram showing an embodiment of the invention using a single motor control relay to control a permanent magnet motor.

In the embodiment shown in FIG. 5, the invention utilizes a single motor control relay, 61, to control a permanent magnet motor, 60. The housing, 4, contains the circuitry which operates from two external electrical inputs. A highway crossing relay, 72, provides an up signal input, signifying that it is desired that the highway crossing arm be in its up position. In addition a power source is also supplied to the controller housing, 4. Also supplied is a common, and this may be one or more wires which provide for the up and power signal returns. The housing also contains a controller device such as a series of cam-mounted limit switches or other sensors which provide switch closures for specific positions of the gate arm. The controller contacts may be cam-operated limit switches on a main shaft which is driven through gearing by motor, 60. The previously cited copending application blank shows a mechanical arrangement of the contacts and controller mechanisms which are presently preferred. In operation the circuit controls the gate arm by reversing the armature voltage supply in response to the desired position for the gate arm. When the gate arm is in the up position, 2a, and an up signal is present from contact 72, control relay, 61, is energized and its contacts picked up. A first contact, 62, would be in its energized, or "a," position. Similarly, a second contact, 63, would be in its energized or "a" position and a third contact, 64, would be in its energized or up position "a". Power to the armature, however, is blocked by controller contact, 69, which would be in its down position because the gate arm is sensed at being between 89° and 93°. It is understood that this represents an up position, although other angular positions could also be used for up positions in specific applications of this invention. So that the power supplied to switch contact 69 is not supplied to motor, 60, but instead connected to the hold clear coil, 75. The hold clear coil, 75, in a preferred embodiment is a shaft-mounted brake on the motor, 60. As long as power is supplied to the circuit and the up signal is maintained at 72, the gate arm will be held in the up position by action of the mechanical brake which is activated by the hold clear coil, 75. When the up signal 72 is removed, such as would occur when a vehicle is sensed on the rail in close proximity to the crossing, motor control relay, 61, drops out. As a result, contact, 62, 63, 64 move to their respective "b" positions. Under this condition it is desirable to drive the arm downward from its uppermost, 2a, position. Power is fed through contact 63b, current limiting resistor, 66, controller contact, 68, and contact 64b, to the motor and then returned via contact 62b. During this period the motor drives the arm from a position 2a to an intermediate position such as, for example, 45° at position 2b. It is understood that the intermediate position where the control will change from a drive-down mode to a dynamic braking or coasting mode can vary, depending on the specific application. The example here is that the circuit will change from a drive-down mode at a point approximately 45°, such as at position 2b.

When the gate arm reaches position 2b, controller contact, 68, is opened by sensing the position of the arm or main shaft, such as through the action of a cam-operated limit switch. Contact, 68, then interrupts the motor current, and the motor continues to turn through the inertia and gravity on the gate arm, 2. During that time, from position 2b to position 2c, it will usually be desired to exercise some control over the speed of the descending gate arm, 2. Provision is made in this preferred embodiment through the utilization of a diode, 70, and a snubbing or dynamic braking resistor, 65. The snubbing resistor can be chosen to be quite low, such as 1 ohm, for example, or other value which provides a gradual descent of the gate arm to its horizontal or down position, 2c. At a horizontal or down position the arm is in position 2c and power is not being supplied to the permanent magnet motor, 60. When the up signal is again provided to the control to indicate that the gate arm be raised, the motor control relay, 61, is caused to pick up and contacts 62, 63 and 64 are raised to their "a" positions. Power is now supplied to the motor to drive the arm, 2, upward via contact 63a through controller contact, 69a, which is in its "a" position. Controller contact, 69, is in its "a" position because it has sensed the arm to be in a not up position such as 0° to 89° and, therefore, the contact is in its upper or "a" position. Power is then supplied through contact 69a to the circuit breaker, 73, and contact 62a to the motor, 60. Contact 64a provides the return path for the power circuit. Should an overload be experienced on the power circuit on the drive-up mode, the embodiment has an overload circuit breaker, 73, which would be opened. When circuit breaker 73 is opened, a further current-limiting resistor, 74, is inserted in the circuit to reduce the drive-up current. If the overload is cleared, the overload circuit breaker, 73, will reset and maintain its contact. As the arm continues up and reaches approximately 90°, the controller contact, 69, moves from its "a" position to its "b" position, and as such it interrupts the motor current and connects the power from 63a to 69b, which feeds power to the hold clear device, 75. This in effect sets the brake on the gate arm when the gate arm reaches its desired upper position 2a. An auxiliary or manual power down drive switch, 71, is provided which permits the unit to be driven downward directly from the power supply without the series current-limiting resistor, 66. Switch contact, 71, is of particular use when it is desired to replace a broken gate arm, 2. As such, it is used when the up signal from 72 is interrupted and the gate arm and counterweight are in an intermediate position. The intermediate position usually results because of the imbalance since the weight of the gate arm has been reduced if it has been seriously broken. The counterweight now dominates, and the gate arm may not come down to its full lower 2c position due to gravity. The use of the manual switch, 71, permits the motor to use its full available drive torque to drive down the imbalanced counterweight gate arm in this situation. The current-limiting resistor, 66, can normally be on an order of magnitude of 20 ohms. Depending on the specific motor characteristics, other values may be chosen. The overload resistor, which provides current limiting during an overload of the drive up, can typically be a value of approximately 1 ohm, although other values can be used.

As shown in FIG. 5, the circuit embodying the invention uses only a single motor control relay, 61. Using the single motor control relay and the controller contacts, the invention provides a reliable control of a highway crossing gate mechanism that utilizes a permanent magnet motor. In comparing FIG. 5 with prior art FIGS. 2 through 4, it is apparent that the advantages of using permanent magnet motor and a single motor control relay are realized in the invention. While this embodiment has been shown which includes the necessary functions for highway gate control, it is understood that other functions can be added to the embodiment shown in FIG. 5 in the practice of the invention. Multiple stages of dynamic braking, portions of gate arm travel in which the mechanism coasts and other functions provided in conjunction with the control circuit can be utilized. Other controller contacts can be used for various functions, including lights and audible alarms. The embodiment shown can be combined with other functions to provide more complex gate control patterns; however, it may generally be preferred to keep the circuitry as simple as possible to increase reliability and vitality.

The circuit shown uses a single motor control relay. To maintain the high degree of vitality, it is desirable that the relay be what is recognized in the railway signal industry as a vital relay. Preferred embodiments include the utilization of the PN150 Plug-In Relay as sold by Union Switch & Signal, Pittsburgh, Pa. Other vital relays and indeed other relays may be used as the motor control relay in the practice of this invention. While the motor control relay shown has three sets of contacts, it is to be understood that such relay may have other contacts which can be used for additional functions, some specific applications.

The scope of the invention includes the embodiments shown and discussed, as well as other embodiments included within the following claims.

I claim:

1. A highway crossing gate control for driving a gate arm between an up position and a down position in response to an up signal comprising:

a permanent magnetic DC motor mechanically connected to drive such gate arm up when rotated in a direction and to drive such gate arm down when rotated in a direction opposite to said direction;

a motor control relay connected to said up signal to be energized in response to such up signal;

said motor control relay having a first contact set having a connection between a side of the armature of said motor and a first contact upon energization of said motor control relay, and having a connection between said armature and a second contact only when said motor control relay is de-energized;

said motor control relay having a second contact set having a connection between a power supply and a first contact upon energization of said motor control relay, and having a connection between said power supply and a second contact when said motor control relay is de-energized;

said motor control relay having a third contact set having a connection between the opposite side of said armature and a first contact when said motor control relay is energized and having a connection between said opposite side of said armature and a second contact when said motor control relay is de-energized;

a first controller switch having an up contact set made only when such gate arm is in such up position and a down contact set made only when such gate arm is in a position other than such up position;

said first controller switch connected between said first contact of said first contact set and said first contact of said second contact set such that said down contact set of said first controller switch is in the current path between said first contact of said first contact set and said first contact of said second contact set;

said up contact set of said first controller switch is operably connected to a hold clear device for maintaining such gate arm in the up position; and an electrical circuit path between said second contact of said second contact set and said second contact of said third contact set.

2. The highway crossing gate control of claim 1 further including:

a second controller switch in said electrical circuit path between said second contact of said second contact set and said second contact of said third contact set; and said second controller switch having a closed state for such gate arm between said up position and an intermediate position, and a closed state for such arm between said intermediate position and such down position.

3. The highway crossing gate control of claim 2 further including a shunt path across said armature of said motor; and said shunt path including a dynamic braking resistor and a diode biased to provide dynamic braking when said motor turns in a downward direction.

4. The highway crossing gate control of claim 3 further including an overload circuit breaker in the path between said first contact of said first contact set and said first contact of said second contact set.

5. The highway crossing gate control of claim 4 further including a current limiting resistor shunting said overload circuit breaker.

6. The highway crossing gate control of claim 5 further including a current limiting resistor in said current path between said second contact on said second contact set and said second contact on said third contact set.

7. The highway crossing gate control of claim 6 wherein said motor control relay is a vital relay.

8. The highway crossing gate control of claim 1 wherein said motor control relay is a vital relay.

9. The highway crossing gate of claim 1 wherein said first controller switch is a single pole double throw cam operated switch and said up position and said down position use the front and back contacts of said cam operated switch.

10. The highway crossing gate of claim 7 wherein said first controller switch is a single pole double throw cam operated switch and said up position and said down position use the front and back contacts of said cam operated switch.

* * * * *